(12) United States Patent
Fujiwara et al.

(10) Patent No.: US 6,937,235 B2
(45) Date of Patent: Aug. 30, 2005

(54) THREE-DIMENSIONAL OBJECT SURFACE SHAPE MODELING APPARATUS, METHOD AND PROGRAM

(75) Inventors: Koji Fujiwara, Osaka (JP); Firo Fujii, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 348 days.

(21) Appl. No.: 10/214,363

(22) Filed: Aug. 8, 2002

(65) Prior Publication Data

US 2003/0034971 A1 Feb. 20, 2003

(30) Foreign Application Priority Data

Aug. 9, 2001 (JP) .................................... 2001-242247

(51) Int. Cl.[7] .............................................. G06T 17/00
(52) U.S. Cl. ..................... 345/420; 345/423; 345/426; 345/441; 345/442; 382/154
(58) Field of Search ................. 345/423, 426, 345/441, 442, 420; 382/154

(56) References Cited

U.S. PATENT DOCUMENTS

| 6,256,038 | B1 | * | 7/2001 | Krishnamurthy | ............ | 345/419 |
| 6,363,169 | B1 | * | 3/2002 | Ritter et al. | ............... | 382/154 |
| 6,741,246 | B2 | * | 5/2004 | Perry et al. | ................. | 345/420 |

FOREIGN PATENT DOCUMENTS

| JP | 61-138377 | 6/1986 |
| JP | 2601607 | 1/1997 |
| JP | 2000-149067 | 5/2000 |

OTHER PUBLICATIONS

Matthias Eck et al., "Automatic Reconstruction of B–Spline Surfaces of Arbitrary Topological Type".

* cited by examiner

*Primary Examiner*—Kimbinh T. Nguyen
(74) *Attorney, Agent, or Firm*—McDermott Will & Emery LLP (57) ABSTRACT

In order to provide a curved surface model generating technique which makes use of both advantages of a modeling method by using distance image data and a modeling method by using silhouette data while photographic and measurement data from less angles are utilized, firstly a curved surface model generating section inputs 2D color image data and distance image data. When silhouette image data are extracted from the 2D color image data, initial model data are generated by the Volume Intersection method or the like. The distance image data are converted into world coordinate values by using photographing position/posture data. In a fitting processing section, a fidelity where the distance with the distance image data is used as a measure and a fidelity where the distance with the silhouette image data is used as a measure are added to be evaluated, and a curved surface is fitted to initial model data so that curve surface model data are generated.

18 Claims, 10 Drawing Sheets

THREE-DIMENSIONAL OBJECT SURFACE SHAPE MODELING APPARATUS, METHOD AND PROGRAM

This application is based on application No. JP 2001-242247 filed in Japan, the contents of which is hereby incorporated by reference.

BACKGROUND OF THE INVENTION

1. Field of the Invention

The present invention relates to an improved three-dimensional object surface shape modeling technique. More concretely, the invention relates to an improved three-dimensional object curved surface model data generating technique. Particularly, the invention relates to an improved curved surface model generating technique which makes use of both advantages of a modeling method using distance image data and a modeling method using silhouette data.

2. Description of the Related Art

<Method of Directly Obtaining a Distance Image by Means of Three-dimensional Shape Input Device>

A three-dimensional shape input device, which emits a laser or a pattern light onto an object and capturing a light reflected from a surface of the object by means of a sensor so as to thickly sample and input three-dimensional shape data of the tridimensional object (distance image data), has been used a lot in fields of CG and industrial design (there is a device which does not carry out projection, but its accuracy is low). One of its reasons is that a shape of a real object can be introduced into a virtual space by using a three-dimensional shape input device and thus a desired three-dimensional model can be generated simply.

However, since the above three-dimensional shape input device utilizes an irregular reflection property of a light on a surface of the object, the device cannot input shapes of an object such as black hair with low surface reflectance, an object such as metal having a surface causing mirror reflection and a (semi-) transparent object such as glass properly, or their data are omitted (also in a device which does not carry out projection, the similar phenomenon occurs).

<Method of Utilizing Silhouette Data>

In this case, a Shape from Silhouette method of estimating a shape of an object from a shielding outline of the object is used a lot. One of those methods which is used the most is a Volume Intersection method of obtaining an area of a 3D space within a silhouette of the entire image. This area is called as visual hull, and the most general method of obtaining a visual hull will be explained below.

Figure 11:
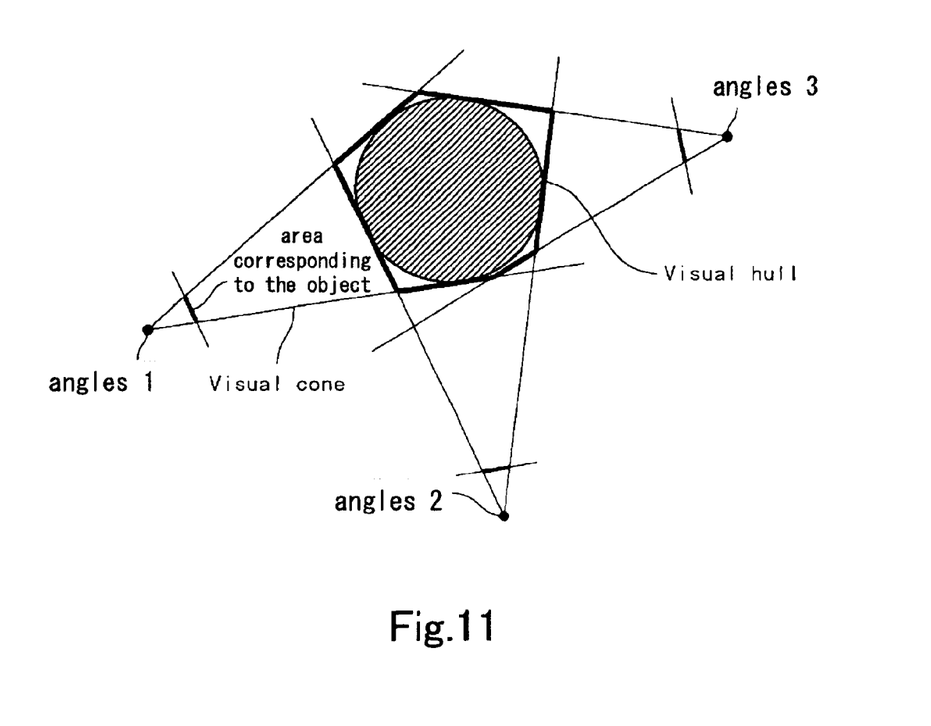
FIG. 11 is a diagram showing a shape data generating method according to a Volume Intersection method.
Figure 12:
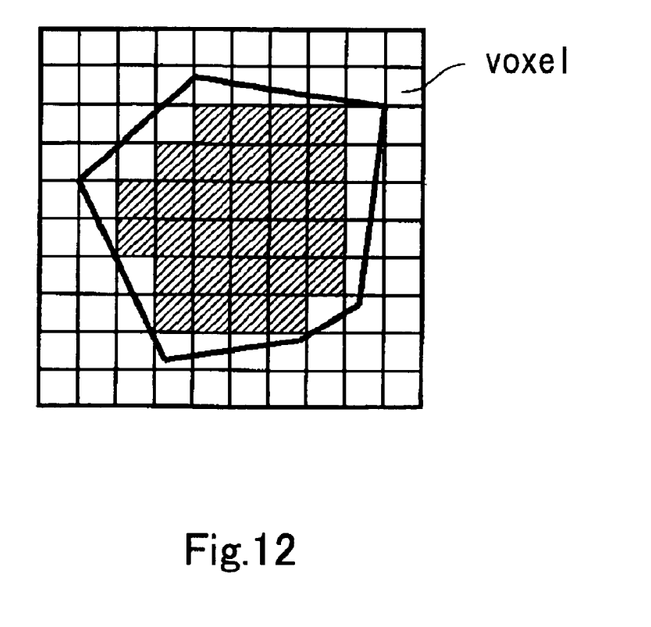
FIG. 12 is a diagram showing voxels which exist in visual hull.

As shown in FIG. 11, an object is photographed from plural angle positions, and positions and postures of the camera are recorded (in the drawing, angles 1, 2 and 3 in the plural angles are shown). As shown in FIG. 12, a lot of cubic elements which are called as voxel in a virtual three-dimensional space are arranged. Here, FIGS. 11 and 12 are tactically two-dimensional schematic diagrams.

The voxels are projected on all images by using the recorded positions and postures of the camera, and only voxels in all the voxels which are projected within an area in all the images corresponding to the object are connected so that the shape of the object is restructured.

Figure 13:
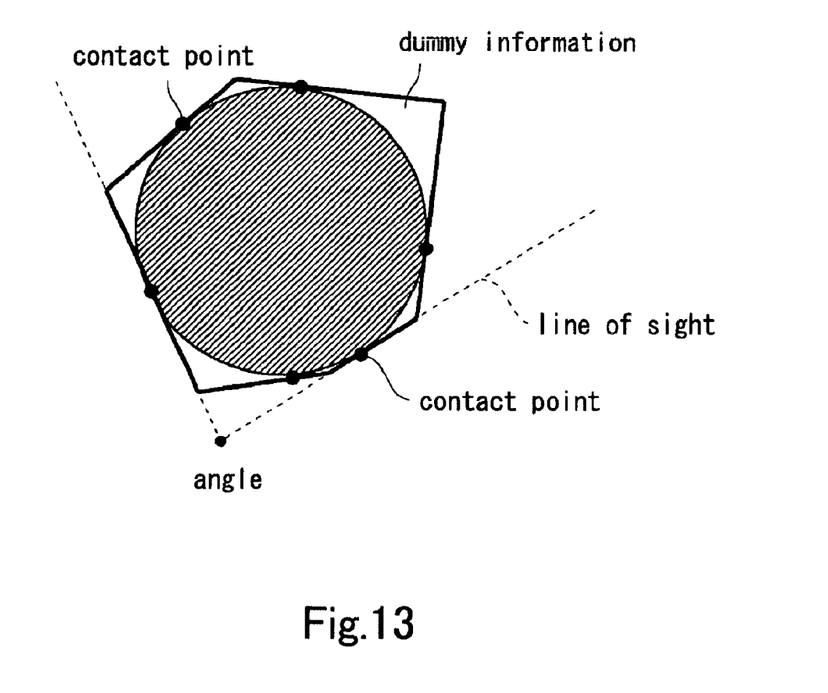
FIG. 13 is a diagram showing contact points between the angles and the object and existence of dummy information about shape data generated by the Volume Intersection method.

In the case where the shape of the object is restructured by the Shape from Silhouette method, one of the points which influences accuracy is a number of angles to be input. Particularly to a free-form surface object since only part of a sculptural surface of an actual object contacts with respective silhouettes, a 3D model to be generated has a shape which swells slightly to the outside except for the contact portion. FIG. 13 shows a portion which is recognized as the swelled shape (dummy information). In order to solve this, the images of the object should be input from a lot of angles.

However, a user should do a lot of works for inputting the images of the object from a lot of angles. It is considered that the images of the object are input from a lot of angles automatically by using turntable, robot arm or the like, or a lot of cameras are previously provided around the object. However, with these methods, size and shape of an object are limited strictly, and an apparatus becomes expensive.

<Another Conventional Method>

Therefore, for example, Sullivan and the others suggest a method of fitting a curved surface model directly to a silhouette and generating a curved surface model which contacts inside with the silhouette. With their method, a smooth property of a spline curved surface is utilized so that a 3D shape of an object can be generated by using input images from less angles.

Here, it is important that a curved surface model is not fitted to 3D data generated by the Shape from Silhouette method and the curved surface model is fitted directly to the silhouette. As a delicate method of generating a smooth curved surface model from a silhouette, it is considered that a curved surface model is fitted to 3D data generated by the Shape from Silhouette method, but in the case where a number of input angles is small, great distortion occurs. As mentioned above, this is because the 3D data generated from silhouette images from particularly less angles by the Shape from Silhouette method include a lot of dummy information.

However, even if this method is used among the object surface, a shape of a recessed portion of an object which does not appear on any images as a silhouette can not be reproduced properly. Namely, in the case where shape data are input by a three-dimensional shape input device, as mentioned above, there arises a problem that omission of data occurs on a black hair portion and a metal surface. Meanwhile, in the case where 3D data are generated from silhouette images, there arises a problem that a recessed portion cannot be reproduced.

Therefore, Japanese Patent No. 2601607 suggests a method of inputting shape data by means of a three-dimensional shape input device and simultaneously independently estimating a shape from silhouette image so as to select one of the shapes as shape information according to reflectance on the object surfaces on the respective portions.

However, this method has a disadvantage that since a shape is independently estimated from a silhouette, a distortion such as a step easily occurs in a boundary with the portion input by the three-dimensional shape input device. Moreover, with this method, since a curved surface is not used for estimating shape data from a silhouette, when the shape is reproduced accurately, input from a lot of angles is necessary.

In order to prevent the generation of a step, it is considered that a curved surface is fitted to or blended with a shape measured by a three-dimensional shape input device and a shape which is independently estimated by the Shape from Silhouette method simultaneously. However, as mentioned above, since the 3D data, which are generated from the silhouette images from particularly less angles by the Shape from Silhouette method, include a lot of dummy information, this method does not produce good results.

OBJECTS AND SUMMARY

The present invention is devised in order to solve the above problems, and its object is to provide an improved three-dimensional object surface shape modeling technique. Particularly its object is to provide an improved three-dimensional object curved surface model data generating technique. More concretely, its object is to provide a curved surface model generating technique which, while utilizing data photographed from less angles, makes use of both advantages of a modeling method using distance image data and a modeling method using silhouette data.

In order to achieve the above object and another objects, a three-dimensional object surface shape modeling apparatus from a certain aspect of the present invention, for generating curved surface model data of a three-dimensional object in a virtual space treated by a computer, includes: a) means for generating initial model data for generating the curved surface model data in the virtual space; b) means for inputting a measuring point group as a collective of three-dimensional coordinate data obtained by measuring the three-dimensional object existing in an actual space; c) means for generating silhouette data from two-dimensional image data obtained by photographing the three-dimensional object existing in the actual space; d) first calculating means for calculating a first fidelity representing approximation between the initial model data and the measuring point group; e) second calculating means for calculating a second fidelity representing approximation between the initial model data and the silhouette data; and f) generating means for deforming the initial model data based on the first fidelity and the second fidelity so as to generate curved surface model data of the three-dimensional object.

In another aspect, the generating means includes f-1) means for fitting a tensor intersection spline curved surface to the initial model data so as to generate the curved surface model data.

In another aspect, the first calculating means includes d-1) means for calculating a first fidelity using a distance between the initial model data and the measuring point group in the virtual space as a measure of approximation, and the second calculating means includes e-1) means for calculating a second fidelity using a distance between the initial model data and the silhouette data in the virtual space as a measure of approximation.

In another aspect, the second calculating means includes e-1-1) means for defining lines of sight passing through photographing angles in the virtual space and outline portions of the silhouettes corresponding to the photographing points so as to calculate a second fidelity using distances between each line of sight and the initial model data in a three-dimensional space as a measure of approximation.

In another aspect, the second calculating means includes e-1-2) means for calculating a second fidelity using a distance in a two-dimensional space between two-dimensional projected data obtained by projecting the initial model data onto a second-dimensional space and the silhouette data as measure of approximation.

In another aspect, the generating means includes: f-2) means for calculating an integrated fidelity including an added amount of the first fidelity and the second fidelity; and f-3) means for, in the case where the integrated fidelity becomes minimum, judging that approximation of the curved surface model data with the three-dimensional object becomes the highest.

In addition, a three-dimensional object surface shape modeling method from a certain aspect of generating curved surface model data of a three-dimensional object in a virtual space treated by a computer, includes: a) the step of generating initial model data for generating the curved surface model data in the virtual space; b) the step of inputting a measuring point group as a collecting of three-dimensional coordinate data obtained by measuring the three-dimensional object existing in an actual space; c) the step of generating silhouette data from two-dimensional image data obtained by photographing the three-dimensional object existing in the actual space; d) the first calculating step of calculating a first fidelity representing approximation of the initial model data with the measuring point group; e) the second calculating step of calculating a second fidelity representing approximation of the initial model data with the silhouette data; and f) the generating step of deforming the initial model data based on the first fidelity and the second fidelity so as to generate the curved surface model data of the three-dimensional object.

In another aspect, the generating step includes f-1) the step of fitting a tensor intersection spline curved surface to the initial model data so as to generate the curved surface model data.

A three-dimensional object surface shape modeling program from a certain aspect generates curved surface model data of a three-dimensional object in a virtual space treated by a computer. The program allows the computer to function as a) means for generating initial model data for generating the curved surface model data in the virtual space; b) means for inputting a measuring point group as a collective of three-dimensional coordinate data obtained by measuring the three-dimensional object existing an actual space; c) means for generating silhouette data from two-dimensional image data obtained by photographing the three-dimensional object existing in the actual space; d) first calculating means for calculating a first fidelity representing approximation of the initial model data with the measuring point group; e) second calculating means for calculating a second fidelity representing approximation of the initial model data with the silhouette data; and f) generating means for deforming the initial model data base on the first fidelity and the second fidelity so as to generate curved surface model data of the three-dimensional object.

In another aspect, the generating means includes f-1) means for fitting a tensor intersection spline curved surface to the initial model data so as to generate the curved surface model data.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawing.

DETAILED DESCRIPTION OF THE PREFERRED EMBODIMENTS

There will be explained below embodiments of the present invention with reference to the drawings.

{1. System Structure}

Figure 1:
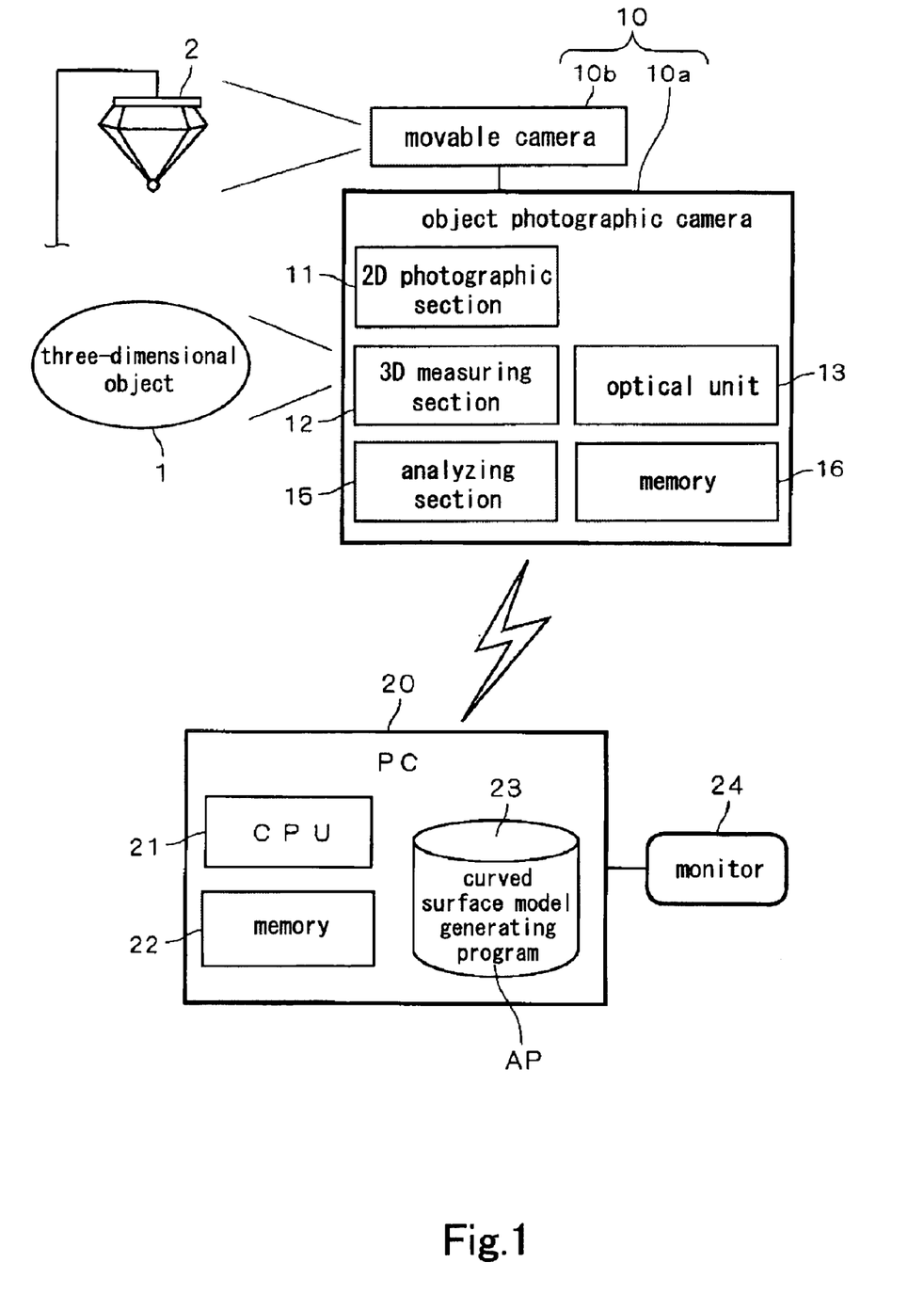
FIG. 1 is a diagram showing an entire system structure for generating a three-dimensional shape model.
Figure 2:
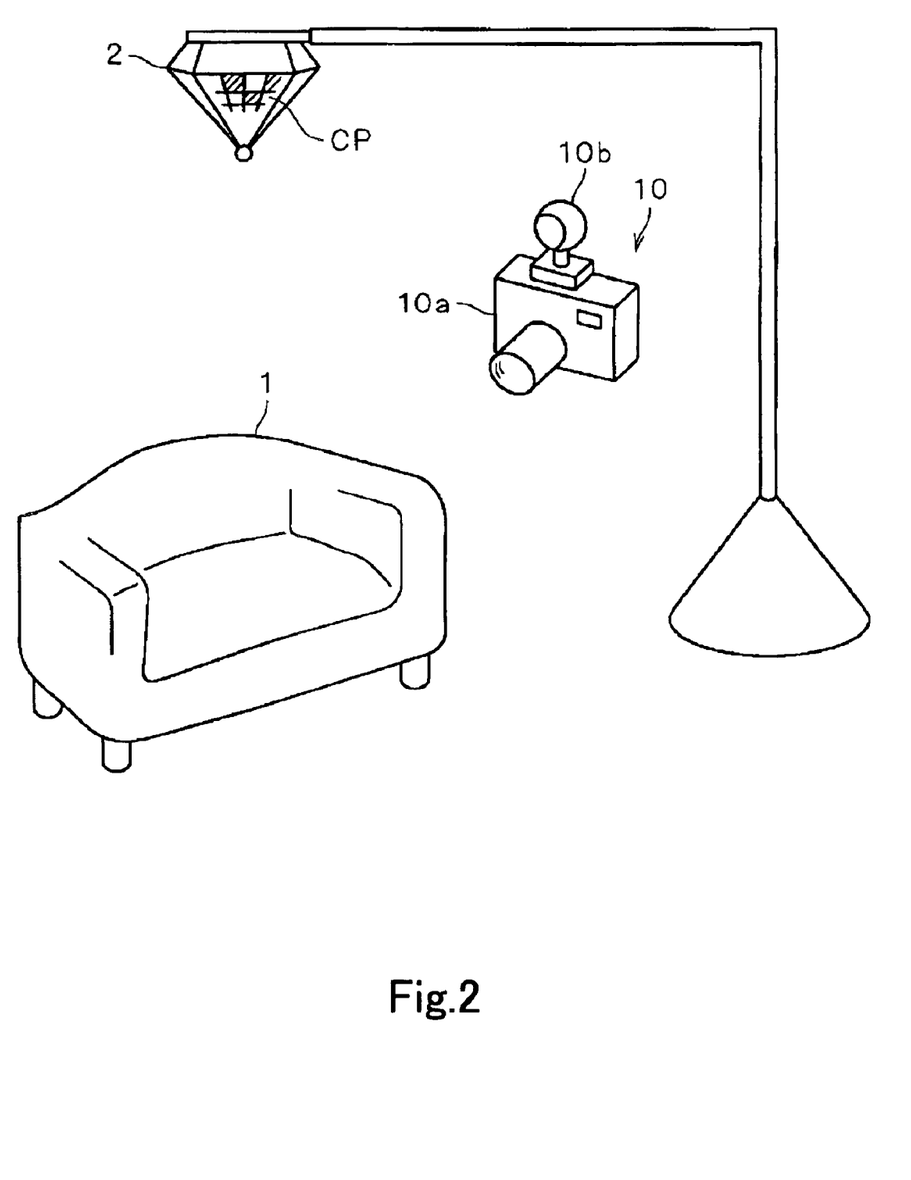
FIG. 2 is an image diagram of a photographic system.

There will be explained below a structure of a personal computer 20 (hereinafter, referred to as PC 20) into which a photographic system composed of a photographic device 10 and a cubic chart 2 and a curved surface model generating program AP are installed with reference to FIGS. 1 and 2.

The photographic device 10 can simultaneously obtain a two-dimensional (2D) color image and distance images (data group of three-dimensional coordinates) of a subject 1 as a three-dimensional object. In the present embodiment, as shown in FIG. 2, a range camera doubled as a digital camera is used as the photographic device 10.

In a space where the subject 1 is arranged, the cubic chart 2 for correcting camera is provided in a vicinity of the subject 1. The cubic chart 2 is a cubic object where a chart pattern CP is given to respective side surfaces of an approximately pyramidal main body, and it is hung from a chart supporting tool. Preferably, the cubic chart 2 is hung approximately above the subject 1.

The photographic device 10 has an object photographic camera 10a and a movable camera 10b. Further, the subject photographic camera 10a has a 2D photographic section 11 having a function as a digital camera, and a 3D measuring section 12 for obtaining a distance image of the subject 1. The movable camera 10b which functions as a position/posture sensor is mounted above the subject photographic camera 10a so that its posture is freely changeable.

The movable camera 10b photographs a plurality of unit graphics included in the pattern on the cubic chart 2 so as to specify a relative position-posture relationship between the cubic chart 2 and the movable camera 10b. Further, the movable camera 10b detects a position and a posture of the subject photographic camera 10a in an absolute coordinate system fixed relatively to the cubic chart 2.

Figure 5:
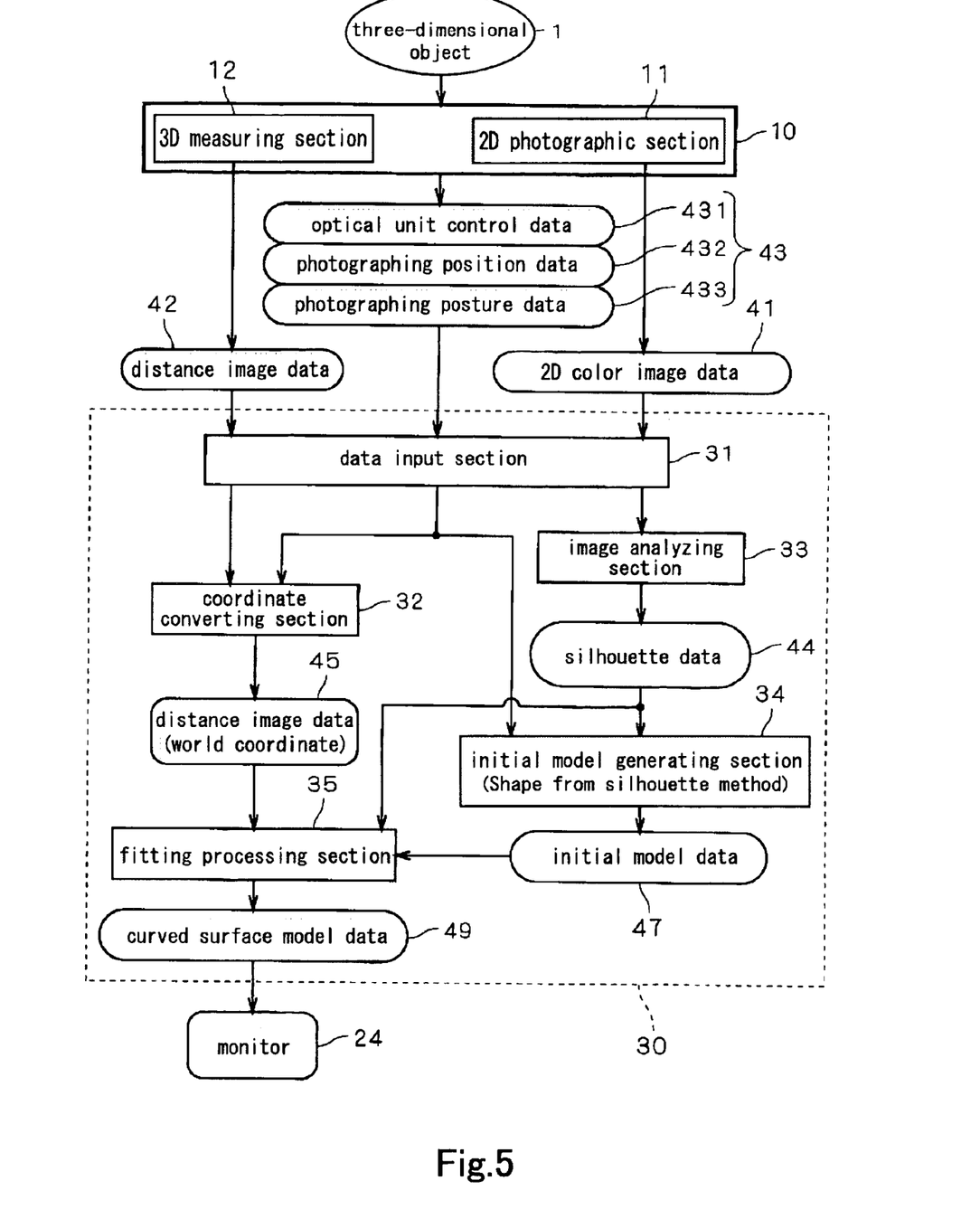
FIG. 5 is a flowchart showing processing contents of the curved surface model generating program.

In the photographic device 10, when a 2D color image and a distance image of the subject 1 are input by the subject photographic camera 10a, simultaneously, an image of the cubic chart 2 is photographed by the movable camera 10b which tracks the cubic chart 2. In an analyzing section 15, the image photographed by the subject photographic camera 10a and the image photographed by the movable camera 10b are analyzed, and photographing position data 432 and photographing posture data 433 of the subject photographic camera 10a are calculated (these data are transmitted to the PC 10 later, as shown in FIG. 5). Instead of the movable camera 10b, a gyro sensor with an acceleration sensor is mounted to the photographic device 10 so as to detect the position/posture data, or the movable camera 10b and the gyro sensor may be combined.

As for the calculated photographing position data 432 and photographing posture data 433 (as for the distance image data, they should be called as measuring position data 432 and measuring posture data 433) are teamed with 2D color image data 41 and distance image data 42 of the subject 1 so as to be recorded in the memory 16.

At this time, similarly optical unit control data 431 are also teamed with them so as to be recorded in the memory 16. The optical unit control data 431 are obtained by converting a control signal output from an optical unit 13 of the subject photographic camera 10a into data, and are control information of focus, zoom and the like of the subject photographic camera 10a.

The optical unit control data 431, the photographing position data 432 and the photographing posture data 433 are totally called as environmental data 43.

The PC 20 has a CPU 21, a memory 22 and the like, and a curved surface model generating program AP is installed into a hard disk 23. The processing contents of the curved surface model generating program AP will be mentioned later, but it executes the process for generating a three-dimensional model of the subject 1 from the 2D color image data 41, the distance image data 42 and the environmental data 43 input from the photographic device 10.

The method of transmitting the data from the photographic device 10 to the PC 20 is not particularly limited, but for example, an infrared communication according to the IrDA (Infrared Data Association) standard can be used.

{2. Summary of the Curved Surface Model Generating Procedure}

Figure 3:
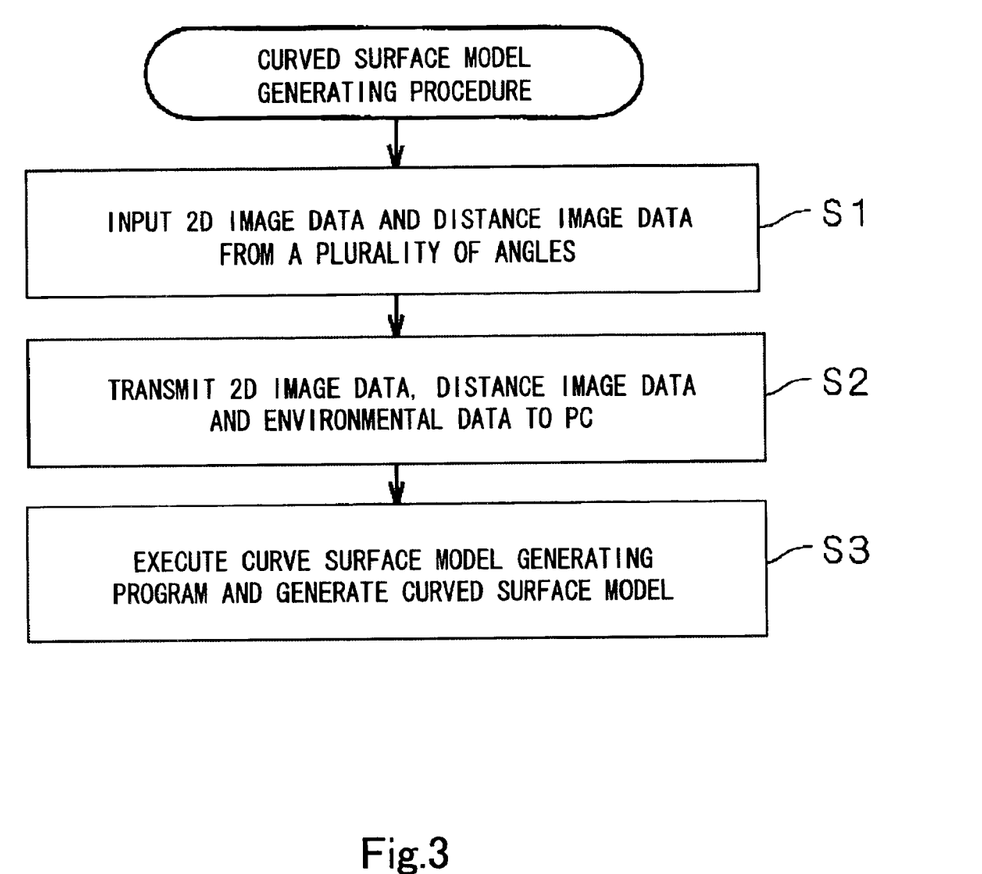
FIG. 3 is a flowchart showing an entire procedure for generating a curved surface model.

There will be explained below the curved surface model generating process by means of the three-dimensional model generating system having the above structure with reference to a flowchart of FIG. 3.

Firstly, a 2D color image and a distance image are photographed and measured from a plurality of angles by the photographic device 10. The photographing and measurement are carried out while the photographic device 10 is being moved to various directions of the subject 1, so that the 2D color image data 41, the distance image data 42 and the environmental data 43 make one group to be recorded into the memory 16 (step S1).

The 2D color image data 41, the distance image data 42 and the environmental data 43 which have been recorded by the photographic camera 10 are transmitted to the PC 20 (step S2).

The curved surface model generating program AP is actuated in the PC 20, and the 2D color image data 41, the distance image data 42 and the environmental data 43 are processed as input data so that curved surface model data 49 which are the three-dimensional shape model are generated (step S3).

{3. Processing Contents by the Curved Surface Model Generating Program}

Figure 4:
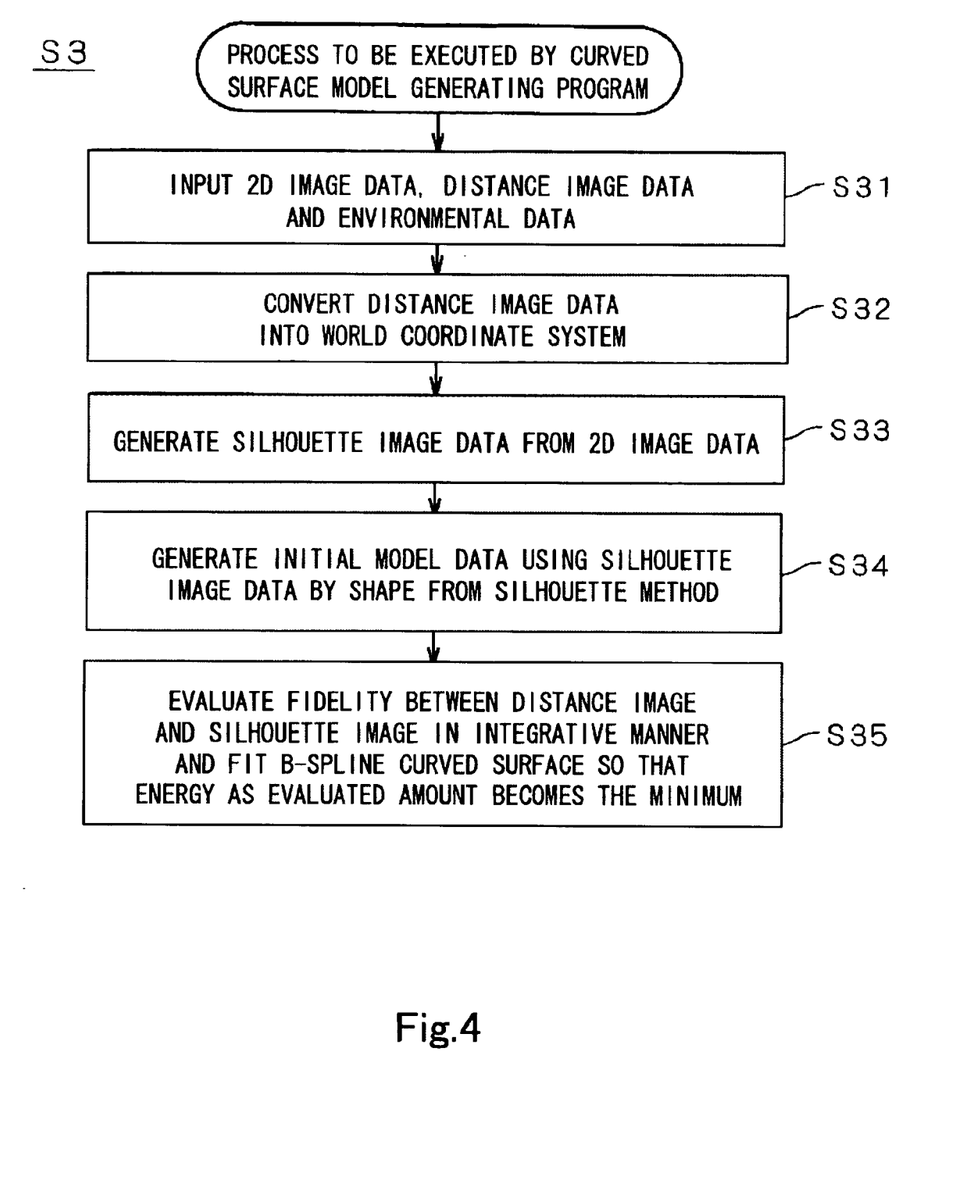
FIG. 4 is a functional block structural diagram of a curved surface model generating program and a diagram showing a flow of data.

There will be explained below the processing contents of the curved surface model generating program AP with reference to a flowchart of FIG. 4 and FIG. 5. FIG. 5 is a diagram showing a functional block structure of the curved surface model generating section 30 and a flow of various data. The curved surface model generating section 30 is a functional section where the curved surface model generating program AP is realized by utilizing hardware resource of the PC 20, and in the diagram, its functional structure is deblocked and shown.

The curved surface model generating section 30 firstly inputs the 2D color image data 41, the distance image data 42 and the environmental data 43 by means of the data input section 31 (step S31). Here, the optical unit control data 431 are converted into optical parameters by utilizing a correspondence table between the previously generated optical unit control data and optical parameters.

<3-1. Conversion of Distance Image Data>

Next, a coordinate of the distance image data 42 is converted by a coordinate converting section 32 of a curved surface model generating section 30 (step S32). The distance image data 42 output from the photographic device 10 are data group of three-dimensional coordinates measured in various photographic positions and photographic postures, and they are recorded as relative coordinates on a basis of a position of the subject photographic camera 10a.

Therefore, the coordinate converting section 31 converts the relative coordinate values of the distance image data 42 into world coordinate values based on the photographing position data 432 and the photographing posture data 433 included in the environmental data 43. The world coordinate values are a coordinate system on a basis of an original point defined on the virtual space, and the distance image data 42 which are measured in various photographing positions and photographing postures are converted into the world coordinate values, so that they can be treated in an uniform coordinate system. The distance image data 42 are coordinated in the world coordinate values, so that the three-dimensional shape data of the subject 1 can be generated. The distance image date which have been converted into the world coordinate values are distance image data 45.

<3-2. Generation of Silhouette Data>

Next, silhouette image data 44 are generated from the 2D color image data 41 by an image analyzing section 33 of the curved surface model generating section 30 (step S33). The image analyzing section 32 analyzes the 2D color image data 41, and extracts an outline of the object based on a color difference between the surface and background of the object so as to generate silhouette data 44. Silhouette image data 44 are binarized image data, for example, data where the inside of the outline is "1" and the outside of the outline is "0".

The silhouette image data 44 are a projection image obtained by projecting the silhouette of the subject 1 viewed from a certain angle (photographing position), namely, the subject 1 onto a two-dimensional space. The 2D color image data 41 which have been photographed from various angles are converted into the silhouette image data 44, so that the silhouettes of the subject 1 viewed from the respective angles can be obtained.

<3-3. Generation of Initial Model Data>

Next, initial model data 47 are generated by utilizing the silhouette image data 44 by an initial model generating section 34 (step S34). The initial model data 47 are data which are the base for generating the curved surface model data 49 finally output from the curved surface model generating section 30. Namely, the curved surface model generating section 30 firstly generates the initial model data 47 as a rough curved surface model of the subject 1, and processes the initial model data 47 so as to finally generate the curved surface model data 49 with high accuracy (namely, closer to the subject 1 in the actual space).

Figure 6:
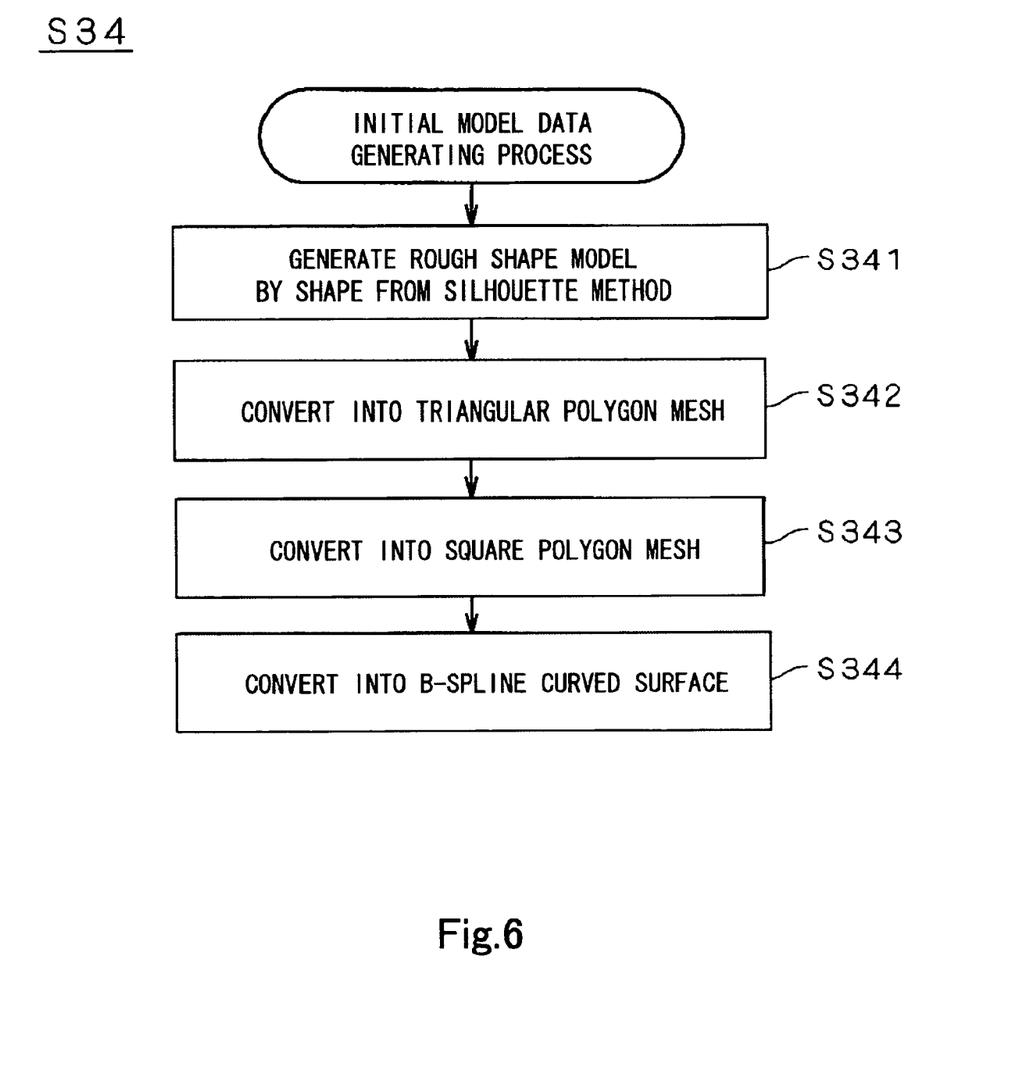
FIG. 6 is a flowchart showing a process for generating initial model data.

There will be explained below the process for generating the initial model data 47 with reference to a flowchart of FIG. 6. In the present embodiment, rough shape data of an object are generated by the Shape from Silhouette method, particularly, the Volume Intersection method (step S41).

As mentioned above, the Volume Intersection method arranges a lot of cubic shapes which are called as voxels in a virtual three-dimensional space. Voxels in a conical area which connects the respective angles (photographing points) and the outline (outer peripheral portion) of the silhouette image data 44 obtained by photographing from the angles are extracted. The voxels which exist in portions common with the respective conical areas are connected so that the rough shape data of the subject 1 are generated. Namely, the shape data of the subject 1 obtained by the Volume Intersection method are arranged as collective of a lot of cubic grids on the virtual space.

Since the respective silhouette image data 44 are data which are extracted from the 2D color images 41 photographed from different angles (photographing positions), the plural silhouette image data 44 are required to be converted into a common coordinate system in order to process them uniformly. Therefore, the initial model generating section 34 arranges the respective angles in the common world coordinate system by utilizing the optical unit control data 431 (optical parameters), photographing position data 432 and photographing posture data 433 included in the environmental data 43, so as to execute the Volume Intersection method.

When the rough shape data of the object are obtained by the Volume Intersection method, the data are then converted into triangular polygon mesh data (step S342). Further, in order to obtain the curved surface at later step, the triangular polygon mesh data are converted into square polygon mesh data (step S343)

As for a method of converting the triangular polygon mesh data into the square polygon mesh data, adjacent triangles are combined so that a square can be obtained, for example as described in Matthias Eck and Hugues Hoppe, "Automatic reconstruction of B-spline surface of arbitrary topological type", SIGGRAPH '96 Proceedings, 1996, Pages 325–334.

Further, a B-spline curved surface is generated from the square mesh data by the method of the above Eck literature (step S344). When this method is used, all control points of the B-spline curved surface are given by affine connection of apexes of the square mesh before the conversion.

In the Eck and the others, method, a spline curved surface patch is generated for each polygon of the square meshes by affine connection between the apexes of the adjacent polygons. At this time, an affine connecting coefficient is determined so that adjacent curved surface patches are connected smoothly, so that an entirely smooth spline curved surface is generated.

That a vector y is represented by the affine connection of $x_1, x_2, \ldots x_N$ means that the vector y is expressed by the equation 1.

$$\begin{cases} y = \sum_i w_i x_i \\ \sum_i w_i = 1 \end{cases} \quad \text{[Equation 1]}$$

In the Eck literature, a control point $y_j$ of the j-th B-spline curved surface is expressed by the equation 2 using apexes $x_1, x_2, \ldots X_N$ of the original square mesh.

$$\begin{cases} y_j = \sum_i w_{ij} x_i \\ \sum_i w_{ij} = 1 \end{cases} \quad \text{[Equation 2]}$$

The B-spline curved surface is one of a tensor intersection spline curved surface which is a parametric curved surface, and it is a sculptured surface which is defined by the same system as the B-spline curved line. In the present embodiment, since the tensor intersection spline curved surface is utilized in such a manner, the curved surface model generated by the present system can be read easily by a general CAD or CG software. Moreover, curvature or tension of a spline curved line can be controlled by moving the control points, but the B-spline curved line has a characteristic that it can be locally controlled by moving the control points. For this reason, the curved surface model can be corrected easily.

The present embodiment used the B-spline curved surface, but another curved surfaces expressed by implicit multinominal function, Bezier curved surface patch, Gregory patch, NURBS and the like may be used.

The initial model data 47 of the subject 1 are generated by the process of the initial model generating section 34. In the present embodiment, the Shape from Silhouette method is used in order to generate the initial model data 47, but the initial model generating method is not particularly limited. Moreover, measuring data are not used, and 3D data of predetermined cubic samples previously stored in a disk or the like may be loaded and used or primitives may be combined so that an initial model may be generated.

The order of the process for converting the distance image data 42 into the world coordinate (step S32) and the process for generating the initial model data 47 (step S34) is not particularly limited, and after the initial model data 47 are generated, the process for converting the distance image data 42 may be subjected to the world coordinate.

<3-4. Fitting Process>

Next, there will be explained below the final process for generating the 3D model data 49 using the initial model data 47 obtained at step S34. More concretely, approximation of the initial model data 47 and the distance image data 45 in the virtual space is obtained as fidelity, and approximation of the initial model data 47 and the silhouette image data 44 in the virtual space is obtained as fidelity, so that integrated fidelity including an added amount of the two fidelities is evaluated as energy. The initial model data 47 are deformed to make this energy minimum, so that the 3D model data 49 are generated. The 3D model data 49 are generated by fitting the B-spline curved surface to the initial model data 47 (step S35).

When the energy including the added amount of the fidelity of the distance image data 45 and the fidelity of the silhouette image data 44 is evaluated by using the following equation.

[Equation 3]

$$J = \lambda_0 J_0 + \lambda_1 J_1 + \lambda_2 J_2$$

In the equation 3, $J_0$ is a root-mean-square of a distance between each angle passing on the silhouette and one point on the curved surface of the curved surface model data 49 being the closest to each angle (in the initial state is the initial model data 47) as described in the Sullivan literature.

Figure 7:
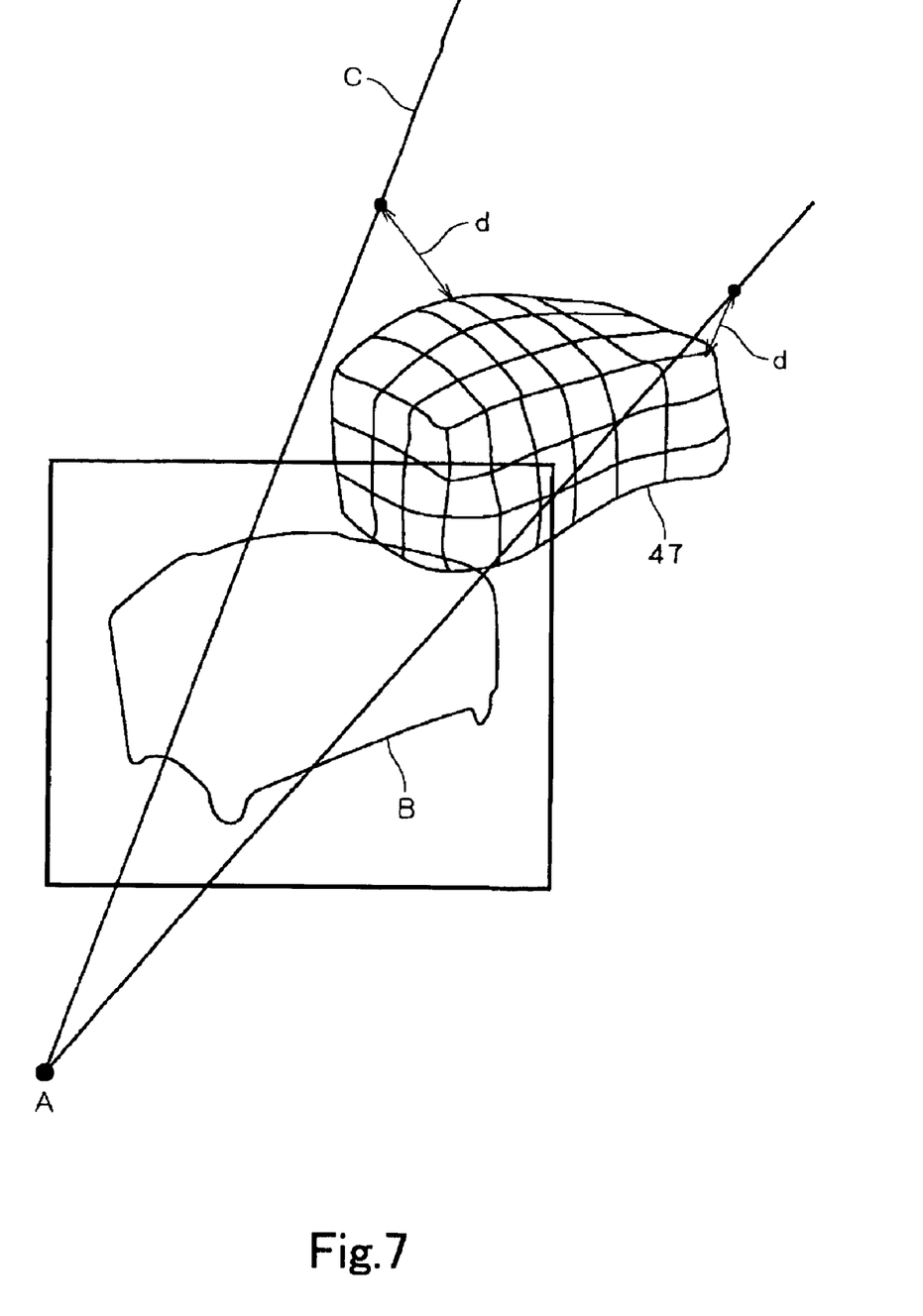
FIG. 7 is a diagram showing a method of calculating a distance with silhouette image data in a three-dimensional space.

There will be explained the concrete calculating method with reference to FIG. 7. As for an angle A and a silhouette B corresponding to the angle A, a line of sight C which connects the point on the outline of the silhouette B and the angle A is considered. When the line of sight C is extended to the area of the initial model data 47 in a virtual space, a distance d from each point on the curved surface of the initial model data 47 to each line of each sight C can be calculated. The point on the curved surface which is the closest to each line of sight C is selected and each distance d is calculated, and a root-mean-square of each distance d for each line of sight is calculated.

Figure 8:
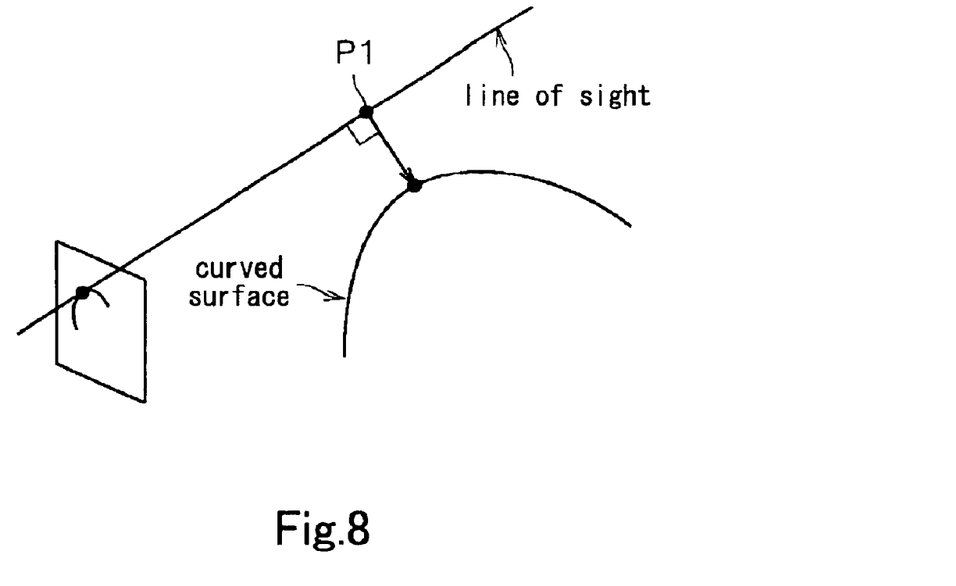
FIG. 8 is a diagram showing a distance which is defined when an angle and a curved surface do not cross.
Figure 9:
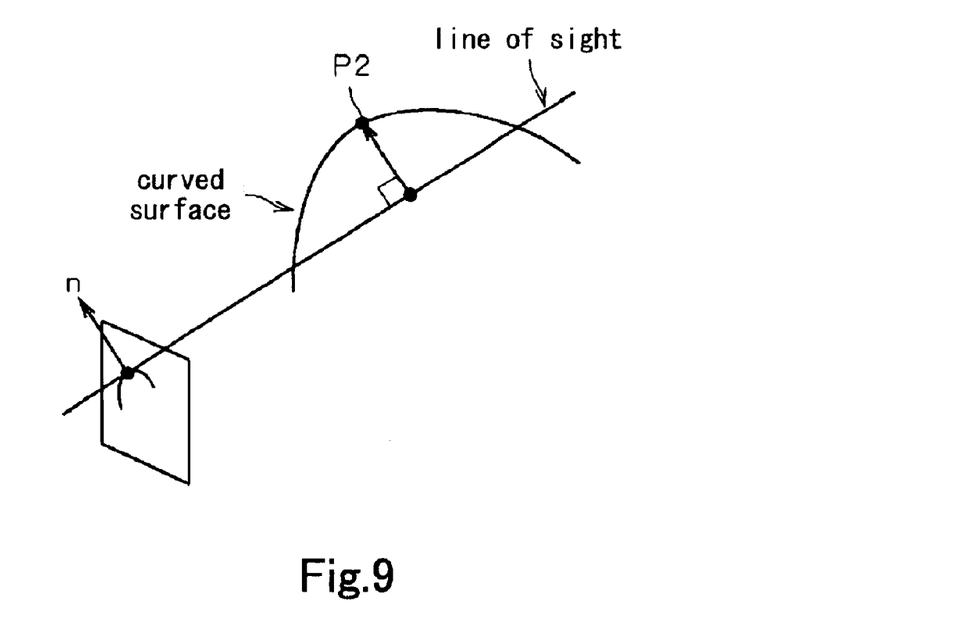
FIG. 9 is a diagram showing a distance which is defined when the angle and the curved surface cross.

In the method by Sullivan and the others, when a line of sight passing through the silhouette does not cross the curved surface of the initial model data 47 (the case shown in FIG. 8), a point P1 on the curved surface which is the closest to the line of sight is a closest point. However, when crossing (the case shown in FIG. 9), since a cross point is always the closest point, in order to prevent this, a point on the curved surface which is the farthest from a line of sight to a direction of a normal line n towards the outside of the silhouette is selected as a closest point P2. The shape model which is generated at step S341 by connecting voxels does not cross a line of sight passing through the silhouette, but when the shape model is deformed into triangular mesh, square mesh and B-spline curved surface at steps S342 to S344, it occasionally swells outside. In this case, a line of sight and the curved surface of the initial model data 47 occasionally cross.

In addition, the most closest point to a line of sight can be calculated easily by a method of previously obtaining three-dimensional coordinate values of all points on the curved surface of the initial model data 47 and selecting the closest point to the line of sight.

Figure 10:
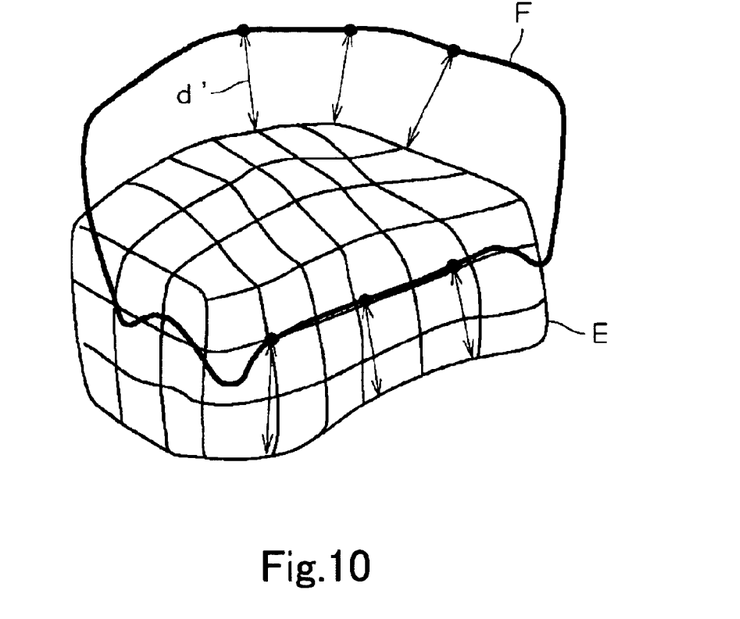
FIG. 10 is a diagram showing a method of calculating a distance with silhouette image data in a two-dimensional space.

As for the method of selecting the closest points on the curved surface to the lines of sight, in the above method, the point which is the closes to a line of sight three-dimensionally is searched, but the point on the image which is the closest to a line of sight may be searched two-dimensionally. For example as shown in FIG. 10, there can consider a method of projecting the initial model data 47 onto the same plane of the silhouette image data 44 (the projected data is projection data E) and selecting the closest point to the point on the silhouette outline F from the points on the silhouette of the projected curved surface. However, in the case where this method is used, the point which is the same as the point selected as the closest point to a line of sight three-dimensionally is not always selected.

In addition, this method is for evaluating that a square sum of a three-dimensional distance between a line of sight and the selected point is minimum, but it may be a method of evaluating that a square sum of a two-dimensional distance on the image (distance d' in FIG. 10) is minimum. With this method, the similar effect may be obtained, but, for example, some zoomed-in images are included in the silhouette image data 44, a difference in the effect is generated. Namely, the zoomed-in image, even if the distances in the actual space are the same, since a number of pixels corresponding to the distances is larger than the case of non-zoomed image, the distance with the curved surface model data 4 on the zoomed-in silhouette image is evaluated with larger measure than that of non-zoomed image by the method of evaluating the two-dimensional distance. As a result, there is an effect that fitting is carried out by weighting so as to conform with the silhouette. Therefore, in the case where there is a portion which is desired to be fitted particularly accurately in the shape of the subject 1, the photographing magnifying power of the portion may be heightened more than the other portions when a 2D image is obtained.

In addition, $J_1$ is a root-mean-square of the distance between each 3D points in the distance image and one point on the curved surface of the curved surface model data 49 which is the closest to each 3D point (in the initial state, the initial model data 47).

$J_2$ is a sum of evaluating curvatures on each portion of the curved surfaces as described in the Sullivan literature, and it is generally called as thin-plate energy. When the curved surfaces are fitted so that the energy $J_2$ becomes small, an effect that the curved surfaces are connected smoothly can be obtained, and particularly this has a role that curved surface portions which are not close to the distance image data 45 and the silhouette image data 44 are connected with their vicinities smoothly.

Namely, in the respective components $J_0$, $J_1$, and $J_2$ of the energy J:

(1) $J_0$ is a positional energy corresponding to a displacement between the curved surface model data 49 (in the initial state, the initial model data 47) and the silhouette image data 44;

(2) $J_1$ is a positional energy corresponding to a displacement between the curved surface model data 49 (in the initial state, the initial model data 47) and the distance image 45; and (3) $J_2$ corresponds to an elastic energy of the curved surface model data 49 (in the initial state, the initial model data 47). The curved surface model data 49 are determined based on a variational principle such that a total sum of these energies becomes minimum.

In the present embodiment, as for the evaluation of fitting curved surfaces, the fidelity where the distance with the silhouette image data 44 is a measure of approximation and the fidelity where the distance with the distance image data 45 is a measure of approximation are evaluated, and the evaluation is made so that a total sum of the fidelities is small. For this reason, the shape model which is closer to the subject 1 having various shapes and surface characteristics can be structured on the whole periphery of the subject 1.

In addition, as for $J_0$ and $J_1$, the root-mean-squares are used as measures of the approximation, but the measures of the approximation are not limited. For example, the evaluation can be made so that an average of the absolute values of the distances is minimum. In any manners, the distance in Euclid space is a measure of approximation, and the evaluation is made so that both the distances with the distance image and the silhouette become small. As a result, the shape model which is approximate visually with the actual subject can be structured.

Parameters of the B-spline curved surface where the value of the equation 3 is minimum can be iteratively calculated by the Hill-climbing method, for example.

As mentioned above, the control points of the B-spline curved surface are composed of the affine connection of the apexes of the original square mesh data. Namely, since the control points of the B-spline curved surface can be determined collectively as the affine connection of an apex row of the original square mesh, the essential information for determining the shape of the curved surface is owned by the apex row of the original square mesh. Therefore, the shape of the curved surface can be controlled completely only by moving the apex row of the original square mesh. Therefore, the fitting processing section 35 moves the apex row of the original square mesh so as to generate the shape of the curved surface to be fitted to the data.

$\lambda_0$, $\lambda_1$ and $\lambda_2$ are constants to be specified by a user. A user operates the constants so as to be capable of carrying out the weighting such that the evaluation for the distance image data is regarded, the evaluation for the silhouette data is regarded and the evaluation for the curvature is regarded. In the case where the subject 1 has a lot of low-reflection portions, it is effective that the evaluation for the silhouette data is regarded. In the case where the subject 1 has a lot of recessed portions, it is effective that the evaluation for the distance image data is regarded.

According to the above method, as for the curve surface model data which are deformed so that the energy J becomes minimum, the lines of sight passing on the silhouette and points on the curved surface which are the closest to each line of sight, and the 3D point in the distance image and the points on the curved surface which are the closest to the 3D points are again obtained. Further, the operation is repeated so that the energy J becomes minimum. When the energy J converges, the process is ended, and the curved surface model data 49 are output.

That is, since the energy J is a multivariable function where the respective control points on the curved surface model data are parameters, when the control points are moved so that entire energy J becomes minimum, not all local energies directly relating to the control points always become minimum. The local energy in the vicinity of some control points becomes higher than the state before change, and a point on a reference image (silhouette image or distance image) for specifying a distance between a control point and the reference image (the points P1 or P2 in the examples of FIGS. 8 and 9: hereinafter referred to as "distance defining point" occasionally appear in an area different from the area in the state before the change. Therefore, even if the energy J is minimized only once, this is not always the optimum solution. For this reason, the repeat operation, such that every time when the energy J is minimized, the distance defining point is redefined, and the energy J is again minimized based on the new distance defining point, is performed until the energy J converges (in other words, until redefining of the distance defining point is not necessary), so that the final optimum solution is obtained.

When the fitting processing section 35 generates the curved surface model data 49, the generated shape model is displayed on a monitor 24. Further, the user corrects the curved surface model data 49 as the need arises. Moreover, the user can correct the generated curved surface model data 49 freely using another CG software or the like.

The curved surface model generating program of the present embodiment is utilized mainly in the field of image production. 3D catalog and 3D manual on WEB are provided recently by display of 3D on the WEB, but these 3D data require a shape model which is closer to an actual object on the whole periphery of the object. Even in the case where an object has portions with low surface reflectance and recessed portions, a shape model can be structured on the entire surface of the object from less number of angles by using the curved surface model generating program of the present embodiment. For this reason, the program can be applied to this field.

Effects of the Invention

As explained above, in a certain aspect of the present invention, the approximation is evaluated uniformly as to both the measuring point group which is a collective of the three-dimensional coordinate data obtained by measuring a three-dimensional object and the two-dimensional silhouette data obtained by photographing the three-dimensional object, so that the curved surface model is generated. For this reason, particularly a three-dimensional shape model with no data omission can be generated with a less angle number while the shape reproducibility on recessed portions of the three-dimensional object can be maintained maximally.

In addition, as an incidental effect which is produced by using the curved surface, there is an effect that an influence of a noise or calibration error is reduced by smoothing data and a sculptured surface is represented by less data amount in comparison with polygon mesh.

In another aspect, since the tensor intersection spline curved surface is adopted as a form of the curved surface, the curved surface can be read easily by general CAD or CG software and can be corrected and analyzed by using these softwares.

In another aspect, a first fidelity is calculated by using the distance between the initial model data and the measuring point group as the measure of the approximation, and a second fidelity is calculated by using the distance between the initial model data and the silhouette data as the measure of the approximation. For this reason, the shape model which is approximate visually with both the measuring point group and the silhouette data can be generated.

In another aspect, since the second fidelity is calculated by using the distance between each line of sight passing on the silhouette and the initial model data as the measure of the approximation, the three-dimensional model with higher reproducibility can be generated.

In another aspect, the integrated fidelity including an added amount of the first fidelity using the distance between the initial model data and the measuring point group as the measure of the approximation and the second fidelity using the distance between the initial model data and the silhouette data is evaluated, and the curved surface model where the integrated fidelity becomes minimum is generated. As a result, overall evaluation where two fidelities are blended is possible.

A certain aspect of the present invention is an invention for the method, and with this method, while shape reproducibility on a recessed portion of the three-dimensional object is being maintained maximally, the three-dimensional shape model without data omission can be generated with a small number of input angles.

Further, another aspect is an invention for the program, and the program is executed in a computer, so that while the shape reproducibility on a recessed portion of the three-dimensional object is being maintained maximally, the three-dimensional model without data omission can be generated with less number of input angles.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A three-dimensional object surface shape modeling apparatus for generating curved surface model data of a three-dimensional object in a virtual space treated by a computer, the apparatus comprising:
   an initial model data generator for generating initial model data for generating the curved surface model data in the virtual space;
   an input device for inputting a measuring point group as a collective of three-dimensional coordinate data obtained by measuring the three-dimensional object existing in an actual space;
   a silhouette data generator for generating silhouette data from two-dimensional image data obtained by photographing the three-dimensional object existing in the actual space;
   a first calculator for calculating a first fidelity representing approximation between the initial model data and the measuring point group;
   a second calculator for calculating a second fidelity representing approximation between the initial model data and the silhouette data; and
   a curved surface model data generator for generating curved surface model data of the three-dimensional object by deforming the initial model data based on the first fidelity and the second fidelity.

2. A three-dimensional object surface shape modeling apparatus according to claim 1,
   wherein the curved surface model data generator generates the curved surface model data by fitting a tensor intersection spline curved surface to the initial model data.

3. A three-dimensional object surface shape modeling apparatus according to claim 1,
   wherein the first calculator calculates the first fidelity by using a distance between the initial model data and the measuring point group in the virtual space as a measure of approximation, and the second calculator calculates the second fidelity by using a distance between the initial model data and the silhouette data in the virtual space as a measure of approximation.

4. A three-dimensional object surface shape modeling apparatus according to claim 3,
   wherein the second calculator defines lines of sight passing through photographing angles in the virtual space and outline portions of the silhouettes corresponding to the photographing points, and calculates the second fidelity by using distances between each line of sight and the initial model data in a three-dimensional space as a measure of approximation.

5. A three-dimensional object surface shape modeling apparatus according to claim 3,
   wherein the second calculator calculates the second fidelity by using a distance in a two-dimensional space between two-dimensional projected data obtained by projecting the initial model data onto a second-dimensional space and the silhouette data as measure of approximation.

6. A three-dimensional object surface shape modeling apparatus according to claim 3,
   wherein the curved surface model data generator calculates an integrated fidelity including an added amount of the first fidelity and the second fidelity, and judges that approximation of the curved surface model data with the three-dimensional object becomes the highest in the case where the integrated fidelity becomes minimum.

7. A three-dimensional object surface shape modeling method of generating curved surface model data of a three-dimensional object in a virtual space treated by a computer, the method comprising the steps of:
   (a) generating initial model data for generating the curved surface model data in the virtual space;
   (b) inputting a measuring point group as a collecting of three-dimensional coordinate data obtained by measuring the three-dimensional object existing in an actual space;

(c) generating silhouette data from two-dimensional image data obtained by photographing the three-dimensional object existing in the actual space;

(d) calculating a first fidelity representing approximation of the initial model data with the measuring point group;

(e) calculating a second fidelity representing approximation of the initial model data with the silhouette data; and (f) deforming the initial model data based on the first fidelity and the second fidelity so as to generate the curved surface model data of the three-dimensional object.

8. A three-dimensional object surface shape modeling method according to claim 7, wherein the step (f) includes fitting a tensor intersection spline curved surface to the initial model data so as to generate the curved surface model data.

9. A three-dimensional object surface shape modeling method according to claim 7, wherein the step (d) includes calculating the first fidelity by using a distance between the initial model data and the measuring point group in the virtual space as a measure of approximation, wherein the step (e) includes calculating the second fidelity by using a distance between the initial model data and the silhouette data in the virtual space as a measure of approximation.

10. A three-dimensional object surface shape modeling method according to claim 9, wherein the step (e) further includes defining lines of sight passing through photographing angles in the virtual space and outline portions of the silhouettes corresponding to the photographing points, and calculating the second fidelity by using distances between each line of sight and the initial model data in a three-dimensional space as a measure of approximation.

11. A three-dimensional object surface shape modeling method according to claim 9, wherein the step (e) further includes calculating the second fidelity by using a distance in a two-dimensional space between two-dimensional projected data obtained by projecting the initial model data onto a second-dimensional space and the silhouette data as measure of approximation.

12. A three-dimensional object surface shape modeling method according to claim 9, wherein the step (f) further includes calculating an integrated fidelity including an added amount of the first fidelity and the second fidelity, and judging that approximation of the curved surface model data with the three-dimensional object becomes the highest in the case where the integrated fidelity becomes minimum.

13. A computer program product for a three-dimensional object surface shape modeling of generating curved surface model data of a three-dimensional object in a virtual space treated by a computer, the computer program product being embodied in a computer readable medium and comprising computer instructions for:

(a) generating initial model data for generating the curved surface model data in the virtual space;

(b) inputting a measuring point group as a collecting of three-dimensional coordinate data obtained by measuring the three-dimensional object existing in an actual space;

(c) generating silhouette data from two-dimensional image data obtained by photographing the three-dimensional object existing in the actual space;

(d) calculating a first fidelity representing approximation of the initial model data with the measuring point group;

(e) calculating a second fidelity representing approximation of the initial model data with the silhouette data; and (f) deforming the initial model data based on the first fidelity and the second fidelity so as to generate the curved surface model data of the three-dimensional object.

14. A computer program product for a three-dimensional object surface shape modeling according to claim 13, wherein the step (f) includes fitting a tensor intersection spline curved surface to the initial model data so as to generate the curved surface model data.

15. A computer program product for a three-dimensional object surface shape modeling according to claim 13, wherein the step (d) includes calculating the first fidelity by using a distance between the initial model data and the measuring point group in the virtual space as a measure of approximation, wherein the step (e) includes calculating the second fidelity by using a distance between the initial model data and the silhouette data in the virtual space as a measure of approximation.

16. A computer program product for a three-dimensional object surface shape modeling according to claim 15, wherein the step (e) further includes defining lines of sight passing through photographing angles in the virtual space and outline portions of the silhouettes corresponding to the photographing points, and calculating the second fidelity by using distances between each line of sight and the initial model data in a three-dimensional space as a measure of approximation.

17. A computer program product for a three-dimensional object surface shape modeling according to claim 15, wherein the step (e) further includes calculating the second fidelity by using a distance in a two-dimensional space between two-dimensional projected data obtained by projecting the initial model data onto a second-dimensional space and the silhouette data as measure of approximation.

18. A computer program product for a three-dimensional object surface shape modeling according to claim 15, wherein the step (f) further includes calculating an integrated fidelity including an added amount of the first fidelity and the second fidelity, and judging that approximation of the curved surface model data with the three-dimensional object becomes the highest in the case where the integrated fidelity becomes minimum.

* * * * *